(12) United States Patent
Kudryavtsev et al.

(10) Patent No.: US 12,377,411 B2
(45) Date of Patent: Aug. 5, 2025

(54) METHOD FOR OBTAINING INORGANIC SORBENT FOR EXTRACTION OF LITHIUM FROM LITHIUM-CONTAINING BRINES

(71) Applicants: Pavel Kudryavtsev, Rehovot, IL (US); Nikolai Kudriavtsev, Holon (IL); Iliya Kudryavtsev, Odintsovo (RU)

(72) Inventors: Pavel Kudryavtsev, Rehovot, IL (US); Nikolai Kudriavtsev, Holon (IL); Iliya Kudryavtsev, Odintsovo (RU)

(*) Notice: Subject to any disclaimer, the term of this patent is extended or adjusted under 35 U.S.C. 154(b) by 537 days.

(21) Appl. No.: 17/956,656

(22) Filed: Sep. 29, 2022

(65) Prior Publication Data

US 2024/0123436 A1    Apr. 18, 2024

(51) Int. Cl.
| | |
|---|---|
| *B01J 39/00* | (2006.01) |
| *B01J 39/02* | (2006.01) |
| *B01J 39/10* | (2006.01) |
| *B01J 49/53* | (2017.01) |
| *C01D 15/00* | (2006.01) |
| *C01G 45/1221* | (2025.01) |
| *C22B 3/42* | (2006.01) |
| *C22B 26/12* | (2006.01) |

(52) U.S. Cl.
CPC .............. *B01J 39/10* (2013.01); *B01J 39/02* (2013.01); *B01J 49/53* (2017.01); *C01D 15/00* (2013.01); *C01G 45/1221* (2013.01); *C22B 3/42* (2013.01); *C22B 26/12* (2013.01); *C01P 2002/50* (2013.01)

(58) Field of Classification Search
CPC . B01J 39/10; B01J 49/53; B01J 39/02; C01D 15/00; C01G 45/1221; C22B 3/42; C22B 26/12; C01P 2002/50
USPC .......................................................... 423/478
See application file for complete search history.

(56) References Cited

U.S. PATENT DOCUMENTS

| | | | |
|---|---|---|---|
| 10,322,950 B2 | 7/2019 | Snydecker et al. | |
| 10,434,497 B2 | 10/2019 | Kudryavtsev et al. | |
| 10,648,090 B2 | 3/2020 | Snydecker et al. | |
| 11,253,848 B2 | 2/2022 | Snydecker | |
| 11,260,366 B2 | 3/2022 | Kudryavtsev et al. | |
| 2013/0280151 A1* | 10/2013 | Lee ....................... | B01J 20/3204 423/247 |
| 2021/0001309 A1* | 1/2021 | Kudryavtsev ............ | B01J 20/08 |
| 2023/0278024 A1* | 9/2023 | Kudryavtsev ............ | B01J 45/00 423/179.5 |

* cited by examiner

*Primary Examiner* — James E McDonough (57) ABSTRACT

The proposed method relates to producing inorganic sorbents for extracting lithium from lithium-containing natural and industrial brines. The method consists of a plurality of sequential steps, which include contacting a mixture of a soluble manganese (II) salt and aluminum (III) salt with an alkali solution in the presence of an alkali metal permanganate to obtain a precipitate of a mixed hydrated manganese (III), manganese (IV), and aluminum (III) oxide. After multiple reactions and conversions of intermediate products of the mixed hydrated manganese (III), manganese (IV), and aluminum (III) oxide, the final product is obtained as an ion exchanger in the H-form of high selectivity to lithium.

20 Claims, 3 Drawing Sheets

METHOD FOR OBTAINING INORGANIC SORBENT FOR EXTRACTION OF LITHIUM FROM LITHIUM-CONTAINING BRINES

FIELD OF ART

The invention relates to the field of chemical technology, namely, to the production of selective inorganic sorbents for the extraction of lithium from lithium-containing natural and technological brines and can be used in the extraction of lithium from natural and technological lithium and lithium-containing brines poor in lithium. In particular, the invention relates to the aforementioned method, which is carried out using highly selective inorganic ion-exchange materials in ion-exchange processes.

DESCRIPTION OF THE PRIOR ART

Historically, lithium is extracted from two sources: continental brines and minerals of hard rocks. At the present time, lithium finds use in the production of glass, ceramics, medical substances, and metallurgical products, as well as in such fields as nuclear energy, aviation, etc. Demand for lithium will certainly grow when vehicles become greener and electricity becomes cleaner. World sales of lithium salts currently amount to more than $1 billion a year because this element has become an important component of lithium-ion batteries, which now feed everything from electric cars to power tools and smartphones.

According to forecasts, over the next eight years, the demand for lithium will increase by more than 300%. Nevertheless, whenever larger electric companies expand the power of solar energy, demanding the storage of high-density energy Li-ion batteries, the demand for lithium skyrockets. For example, Duke Energy (one of the world leaders in energy production) currently stopped the proposed nuclear power plant in Florida and instead planned to invest $6 billion in solar and battery infrastructures. The ever increasing demand for batteries and the need to store high-density energy created an acute dependence of many industries of the world on lithium, which triggered a global search for new lithium sources.

Nowadays, hydro-mineral raw materials have gradually become the main source of lithium. The main attention is on developing methods for processing lithium-containing hydromineral raw materials. The most commonly used method is extracting lithium from natural brines by precipitation of sparingly soluble salts. However, from an ecological point of view, more promising are sorption methods of extraction of lithium from natural and technological brines that are poor in lithium content. Because of the complexity of the composition of salts contained hydromineral raw materials, the most promising method for the recovery of lithium is the use of highly selective inorganic ion-exchange materials.

Methods for the extraction of lithium from lithium-containing natural and technological brines are known in the art.

For example, U.S. Pat. No. 11,260,366 was granted on Mar. 1, 2022, to P. Kudryavtsev. et al. discloses a method of obtaining inorganic sorbents for the extraction of lithium from lithium-containing natural and technological brines by a) obtaining a first non-stoichiometric compound as a precipitate of hydrated mixed oxide of manganese (II) and aluminum (III) by contacting a soluble manganese (II) salt with an alkali solution in the presence of at least one aluminum (III) salt; b) obtaining a second non-stoichiometric compound, which is a precipitate of hydrated mixed oxide of manganese (III), manganese (IV) and aluminum (III) by oxidizing the first non-stoichiometric compound with the use of a solution of an oxidizing agent; c) isolating the obtained second non-stoichiometric compound to obtain a wet paste of hydrated mixed oxide of manganese (III), manganese (IV) and aluminum (III); d) obtaining a third non-stoichiometric compound by granulating and simultaneously drying the obtained wet paste of hydrated mixed oxide of manganese (III), manganese (IV) and aluminum (III); e) obtaining a fourth non-stoichiometric compound by converting the obtained third non-stoichiometric compound into a lithium-form by passing therethrough a lithium-containing solution in an ion-exchange column; f) calcining the obtained fourth non-stoichiometric compound to obtain a fifth non-stoichiometric compound which comprises a mixed oxide of lithium, manganese (III), manganese (IV) and aluminum (III); and g) obtaining a sixth non-stoichiometric compound by converting the obtained fifth non-stoichiometric compound into a hydrogen-form of inorganic ion-exchanger by treating the fifth non-stoichiometric compound with an acid solution.

U.S. Pat. No. 10,434,497 granted on Oct. 8, 2019 to P. Kudryavtsev, et al. discloses a method of producing inorganic sorbents for extracting lithium from lithium-containing natural and technological brines by: contacting a soluble niobate (V) with an acid in the presence of at least one zirconium (IV) salt to obtain a precipitate of a mixed hydrated niobium and zirconium oxide, which is a non-stoichiometric compound; granulating the obtained precipitate of a mixed hydrated niobium and zirconium oxide by freezing with subsequent defreezing to obtain a granulated mixed hydrated niobium and zirconium oxide; converting the obtained granulated mixed hydrated niobium and zirconium oxide into a Li-form of the granulated mixed hydrated niobium and zirconium oxide by treating the granulated mixed hydrated niobium and zirconium oxide with a lithium-containing compound selected from the group consisting of a solution of lithium hydroxide LiOH and a solution of $Li_2CO_3$; calcining the Li-form of the granulated mixed hydrated niobium and zirconium oxide to obtain a granulated mixed lithium, niobium, and zirconium oxide, which is a tripled mixed oxide, which is a Li-form of an inorganic ion-exchanger; and converting the obtained granulated mixed lithium, niobium, and zirconium oxide to an ion-exchanger in an H-form by treating the granulated mixed lithium, niobium, and zirconium oxide with an acid solution.

Another method for extracting lithium from lithium-containing natural and industrial brines is disclosed, in now-pending U.S. patent application Ser. No. 17/688,005 filed on Mar. 7, 2022, by P. Kudryavtsev et al. According to this application, the method relates to manufacturing inorganic ion exchanger represented by the following general formula: $H_aNbO_{(2.5+0.5 \cdot a)} \cdot bLi_2O \cdot cWO_3 \cdot dH_2O$, wherein: "a" is a number ranging from 0.5 to 2.0, "b" is a number ranging from 0.01 to 0.5, "c" is a number ranging from 0.01 to 0.2, and "d" is a number ranging from 0.1 to 2.0. The method consists of the following steps: interacting a soluble niobate (V) with an acid that contains at least one soluble tungsten (VI) compound, thus forming a hydrated niobium (V) oxide and a hydrated tungsten (VI) oxide, which co-precipitate and form a mixed hydrated niobium (V) and tungsten (VI) oxide; granulating the mixed hydrated niobium (V) and tungsten (VI) oxide by freezing with subsequent defreezing, thus obtaining a granulated mixed hydrated niobium (V) and tungsten (VI) oxide; converting the granulated mixed hydrated niobium (V) and tungsten (VI) oxide into a lithium form of a hydrated mixed oxide by treating thereof with a lithium-containing compound selected from the group consisting of aqueous solutions of lithium hydroxide and lithium carbonate; calcining the lithium form of the granulated mixed hydrated niobium (V) and tungsten (VI) oxide to obtain a mixed granulated tripled lithium, niobium (V) and tungsten (VI) oxide, which constitutes a lithium-form of the inorganic ion-exchanger; and converting the lithium-form of the inorganic ion-exchanger into an H-form of the inorganic ion-exchanger by treating thereof with an acid solution.

Despite the apparent similarity in wording, all the above methods are significantly different since they involve different primary reagents and proceed with different chemical reactions achieving the same purpose in different ways. The selection of a specific method may depend on the evaluability and cost of the primary reagents, types of equipment, etc.

The same relates to other groups of patents, which are listed below.

- U.S. Pat. No. 10,505,178, issued on Dec. 10, 2019, to D. H. Snydacker et al., relates to lithium extraction from liquid resources such as natural and synthetic brines, leachate solutions from clays and minerals, and recycled products,
- U.S. Pat. No. 10,648,090, issued on May 12, 2020, to D. H. Snydacker et al., also relates to lithium extraction from liquid resources, such as natural and synthetic brines, leachate solutions from clays and minerals, and recycled products.
- U.S. Pat. No. 11,253,848, issued on Feb. 22, 2022, to D. H. Snydacker, also relates to lithium extraction from liquid resources such as natural and synthetic brines, leachate solutions from minerals, and recycled products.
- U.S. Pat. No. 10,322,950 issued on Jun. 18, 2019, to D. H. Snydacker et al. discloses a method for extracting lithium from solutions containing lithium ions via reversible cation exchange with $H^+$. The method utilizes a metal oxide or a metalloid oxide cation exchange materials having an active sublattice that preferentially binds $Li^+$ cations relative to both $H^+$ and $Na^+$ in a sample solution and preferentially binds $H^+$ relative to $Li^+$ in an acidic solution.

SUMMARY THE INVENTION

The present invention relates to producing inorganic sorbents for lithium extraction from lithium-containing natural and technological brines and is based on highly selective inorganic ion-exchange materials in ion-exchange processes.

The method consists of a plurality of sequential steps, which are the following: contacting a mixture of at least one soluble manganese (II) salt in an aqueous solution and at least one aluminum (III) salt in an aqueous solution with an alkali solution in a reaction container in a mother solution in the presence of an alkali metal permanganate to obtain a precipitate of a mixed hydrated manganese (III), manganese (IV), and aluminum (III) oxide, which is a non-stoichiometric compound; washing the obtained precipitate by decanting with deionized water to a certain content in the mother solution of the at least one alkali metal salt; discontinuing the decanting and settling the precipitate in the reaction container to a predetermined level; removing a transparent part of the mother solution to obtain a precipitate suspension in a residue of the mother solution; transferring the obtained precipitate of the precipitate suspension in the residue of the mother solution to a freezer container and freezing the precipitate to a solid frozen state for obtaining a mixed hydrated manganese (III), manganese (IV), and aluminum (III) oxide in an icy granular form having a surface; removing at least one alkali metal salt from the surface of the icy granular form; thawing the mixed hydrated manganese (III), manganese (IV), and aluminum (III) oxide to form a resulting granulated mixed hydrated manganese (III), manganese (IV), and aluminum (III) oxide and thawing the mother solution to form a thawed mother solution; separating the icy granular form from an excess of the thawed mother solution; converting the resulting granulated mixed hydrated manganese (III), manganese (IV), and aluminum (III) oxide into an H-form of the granulated mixed hydrated manganese (III), manganese (IV), and aluminum (III) oxide by treating thereof with a solution of an acid; converting the H-form of the granulated mixed hydrated manganese (III), manganese (IV), and aluminum (III) oxide into a Li-form of the granulated mixed hydrated manganese (III), manganese (IV), and aluminum (III) oxide by treating thereof with a solution of a lithium-containing compound; drying and calcining the Li-form of the granulated mixed hydrated manganese (III), manganese (IV), and aluminum (III) oxide to obtain a dehydrated granulated mixed manganese (III), manganese (IV), and aluminum (III) oxide, which contains in its composition four oxides and comprises a lithium-form of an inorganic ion-exchanger; and converting the obtained lithium-form of an inorganic ion exchanger into an H-form of the ion-exchanger by treating thereof with an acid solution.

DETAILED DESCRIPTION OF THE INVENTION

The invention relates to the field of chemical technology, namely, the production of selective inorganic sorbents for lithium extraction from natural and technological brines. The invention may be used in lithium extraction from weakly acidic and neutral solutions with a high content of sodium ions and ions of other metals. In particular, the invention relates to the aforementioned method, which uses ion sieves.

The term "brines" used in the present patent specification covers any natural or technological solutions containing lithium.

Ionic sieves are inorganic ion-exchange sorbents that exhibit the so-called ion-sieve effect, which is the effect of separating ions in a solution according to the difference in their ionic radii. Dimension positions in the crystal structure of the material corresponding to certain ions and ions of a larger size cannot enter unspecified positions. Thus, the ion-sieve effect provides high selectivity in the sieve-effect sorbents. A unique feature of the method of the present invention (hereinafter referred to merely as "the method") is that the method makes it possible to obtain inorganic ion-exchange sorbents with a specific structure that provides high selectivity, especially for lithium ions.

It is important to note that in the context of the present patent specification, the term "hydrated mixed oxide", e.g., of manganese (III), manganese (IV), and aluminum (III) oxide", does not mean a mechanical mixture of hydrated manganese (III) and (IV) oxides with hydrated aluminum oxide, but rather means a chemical compound of non stoichiometric composition.

The invention aims to improve the sorbent's exchange capacity and selectivity regarding lithium ions.

This goal is achieved by the invented method, which is based on a combination of certain steps and their sequence, as described below.

The first step of the method consists of preparing a mixture of at least one soluble manganese (II) salt in an aqueous solution with at least one aluminum (III) salt in an aqueous solution with an alkali solution in a reaction container. This procedure is carried out in a mother solution in the presence of an alkali metal permanganate to obtain a precipitate of a mixed hydrated manganese (III), manganese (IV), and aluminum (III) oxide.

An alkali metal permanganate suitable for the purposes of the invention may be exemplified by potassium permanganate $KMnO_4$, sodium permanganate $NaMnO_4$, rubidium permanganate $RbMnO_4$, cesium permanganate $CsMnO_4$ and ammonium permanganate $NH_4MnO_4$.

The obtained precipitate constitutes a non-stoichiometric compound. The soluble manganese (II) salt may be represented, e.g., by $MnSO_4$, $MnCl_2$, $Mn(NO_3)_2$, $Mn(Ac)_2$, $MnBr_2$, or $Mn(ClO_4)_2$. The aluminum (III) salt may be represented, e.g., by $Al_2(SO_4)_3$, $AlCl_3$, $Al(OH)Cl_2$, $Al(NO_3)_3$, $Al(Ac)_3$, $Al(ClO_4)_3$, or $AlBr_3$. The alkali solution that contacts the mixture of the at least one soluble manganese salt (II) and the at least one aluminum salt (III) in the presence of an alkali metal permanganate is a hydroxide such as, e.g., NaOH, KOH, or $NH_4OH$.

In the aforementioned mixture of the aqueous solution of the at least one soluble manganese (II) salt and the aqueous solution of the at least one aluminum (III) salt, a molar ratio of manganese (II) to aluminum (III) is maintained in the range of 1:0.0 to 1:0.20.

Figure 1:
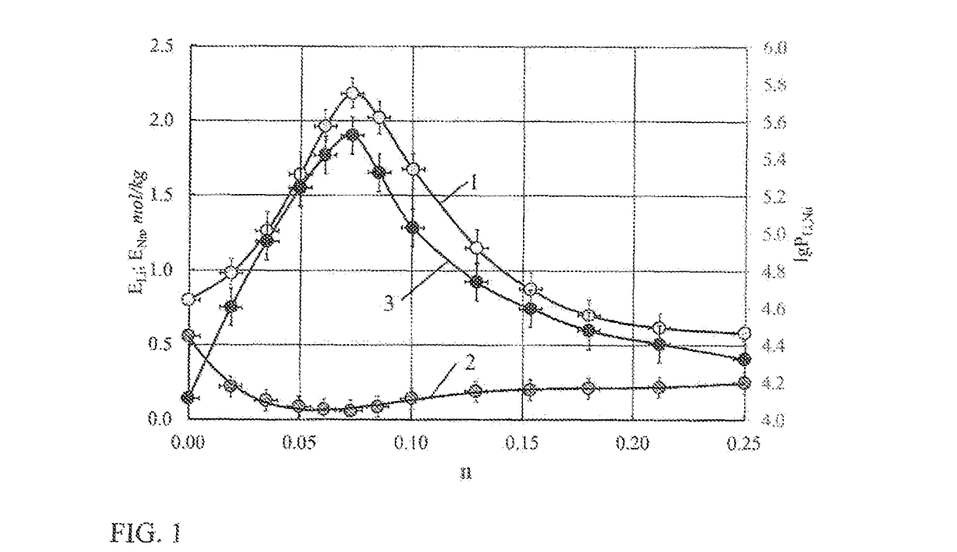
FIG. 1 is a graph illustrating the adsorption capacity for lithium ($E_{Li}$—Curve 1), adsorption capacity for sodium ($E_{Na}$—Curve 2), and separation factor of lithium and sodium ions ($P_{Li,Na}$—Curve 3) on the content of aluminum oxide in the sorbent (n is a molar ratio $Al_2O_3/MnO_x$ in the content of the inorganic sorbent).

Such a range was chosen based on experiments, conducted in studying the effect of additives shown in FIG. 1, which is a graph showing the dependence of the capacity for lithium ($E_{Li}$), sodium ($E_{Na}$), and the separation factor of lithium ions and sodium ($P_{Li,Na}$) on the content of alumina in the sorbent. In this drawing, n is and expresses a molar ratio of oxides $Al_2O_3$ to $MnO_x$ in the composition of the inorganic sorbent. The optimal value of n is 0.075±0.009.

Suppose the molar ratio of manganese (II) to aluminum (III) in the aforementioned mixture exceeds 1:0.20. In that case, the selective capacity of the sorbent for lithium will be lower than in the respective composition without the addition of an aluminum (III) salt.

The aforementioned first step of contacting the mixture of at least one soluble manganese salt (II) and at least one aluminum salt (III) with an alkali solution in the presence of an alkali metal permanganate is performed at a molar ratio of the soluble manganese (II) salt to the alkali metal permanganate in a ratio from 1:1 to 1:2.

Figure 2:
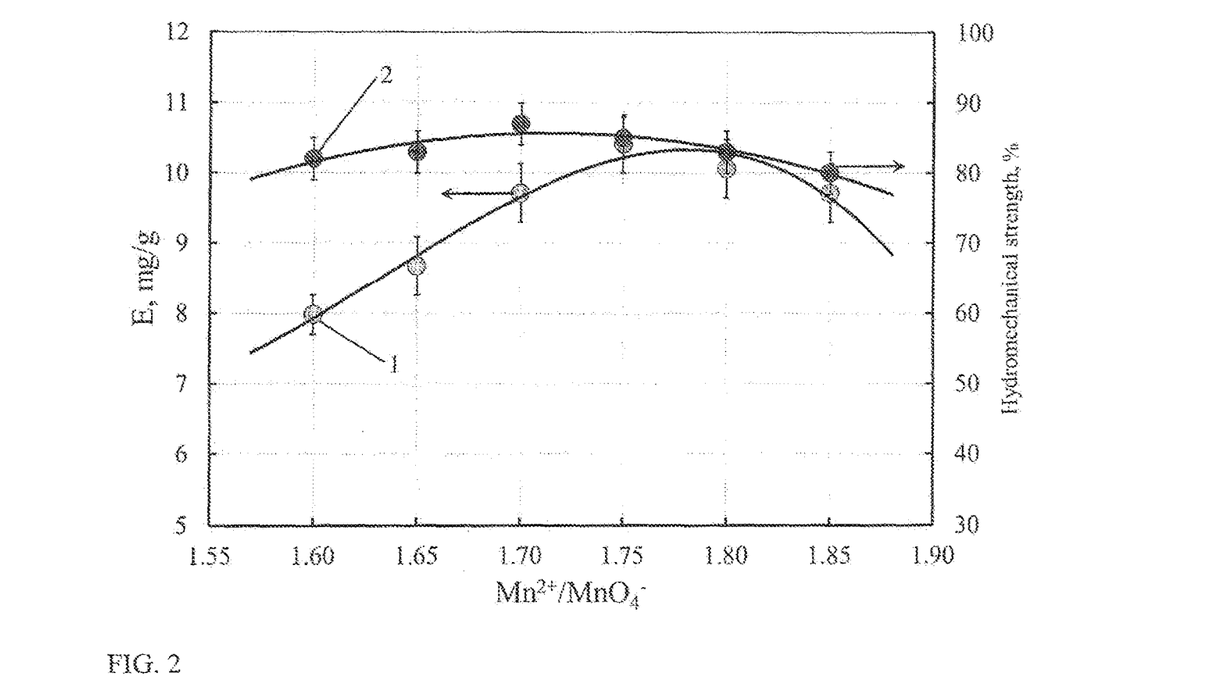
FIG. 2 is a graph showing the dependence of the ion-exchange capacity for lithium obtained by sorption from a 0.1 N LiCl solution (Curve 1) and the hydromechanical stability of the sorbent (Curve 2) on the $Mn^{2+}/MnO_4^-$ molar ratio.

Such a range was chosen based on experiments that studied the dependence of the ion-exchange capacity of the sorbent during the sorption of lithium from a 0.1 N LiCl solution and the hydromechanical stability of the sorbent on the $Mn^{2+}/MnO_4^-$ molar ratio, shown in FIG. 2.

If this molar ratio is below 1:1, this may lead to insufficient oxidation of Mn(II) with alkali metal permanganate, and this, in turn, may lead to a decrease in the content of hydrated manganese (IV) oxide and to increase in the content of hydrated manganese (III) oxide in the resulting non-stoichiometric compound. As a result, the ion-exchange capacity and selectivity of the sorbent to lithium ions will be reduced. In some cases, the content of hydrated manganese (III) oxide may also decrease with the appearance of traces thereof, which, in addition to reducing the capacity and selectivity of the sorbent for lithium ions, will lead to a decrease in its chemical stability due to the dissolution of hydrated manganese(II) oxide.

The manganese (II) salt in an aqueous solution, which is used in the method, should be at concentrations in the range from 0.1 M to 2.5 M.

If this ratio is below 0.1 M, water consumption significantly increases, which is unfavorable both from environmental and economic points of view. If, on the other hand, this ratio exceeds 2.5 M, the concentration of manganese becomes lost to the value of a saturated solution. For example, suppose during synthesis, the concentration of manganese (II) sulfate reaches 3.4 M. In that case, this may lead to heterogeneity and local saturation of the solutions in the process equipment, which will lead to heterogeneity of the sorbent. The occurrence of inhomogeneities during the synthesis of the sorbent reduces its capacity and selectivity concerning lithium ions.

Furthermore, in the first step, i.e., in the step of contacting a mixture of at least one soluble manganese (II) salt in an aqueous solution and at least one aluminum (III) salt in an aqueous solution with an alkali solution in the presence of an alkali metal permanganate, the pH of the precipitate suspension is adjusted to a value in the range of 9.0 to 12.0.

Figure 3:
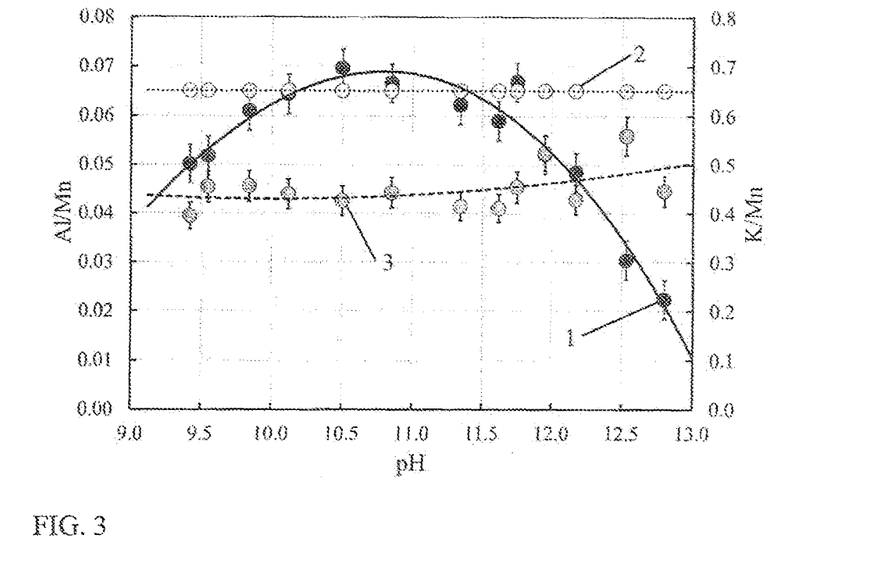
FIG. 3 is a graph showing the dependence of the obtained molar ratio $Al_2O/MinO_x$ (Curve 1) and $K/MnO_x$ (Curve 3) in the solid phase on the Ph of the precipitated mixed hydrated manganese (III), manganese (IV), and aluminum (III) oxide. Curve 2 is the $Al_2O/MnO_x$ molar ratio given at synthesis.

Such a range was chosen based on experiments conducted to study the dependence of the obtained molar ratios of $Al_2O_3/MnO_x$ (Curve 1) and $K/MnO_x$ (Curve 3) in the solid phase of the sorbent on the pH of the precipitated mixed hydrated manganese (III), manganese (IV), and aluminum (III) oxide shown in FIG. 3.

Figure 4:
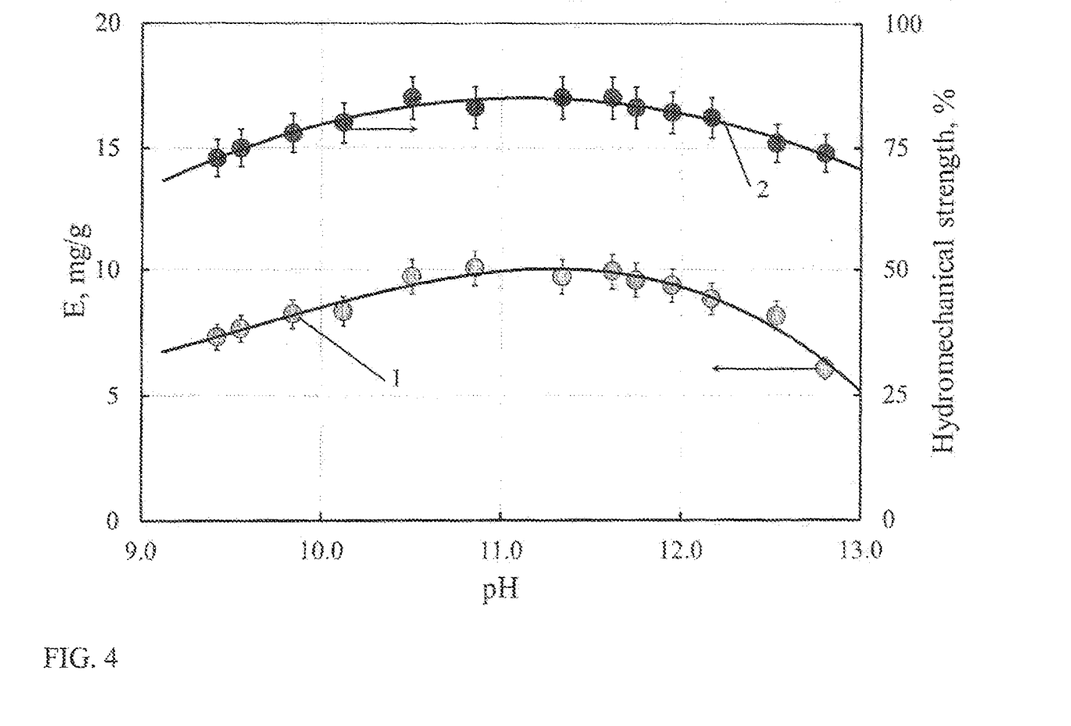
FIG. 4 is a graph showing the dependence of the sorption capacity for lithium (Curve 1—sorption of lithium from a 0.1 N LiCl solution) and the hydromechanical stability of the sorbent (Curve 2) on the precipitate pH.

In addition to the experimental data mentioned above, this range was also chosen based on experiments that studied the ion-exchange capacity of the sorbent during lithium sorption from a 0.1 N LiCl solution and the hydromechanical stability of the sorbent on the pH of the precipitate. This is shown in FIG. 4.

If the value of pH in the precipitation solution is below 9.0, this will lead to insufficient precipitation of hydrated oxides of manganese (III), manganese (IV), and aluminum (III). In addition there will be a decrease in the amount of potassium ions, which are a part of the mixed hydrated manganese (III), manganese (IV), and aluminum (III) oxide that participate in the ion exchange reaction. Being a part of epy mixed hydrated manganese (III), manganese (IV), and aluminum (III) oxide, the potassium ions protect the hydroxyl groups of the oxide composition from condensation. Thus, a decrease in the pH of the precipitate below 9.0 leads to a decrease in the ion-exchange capacity of the synthesized sorbent. If, on the other hand, the pH value in the precipitation solution exceeds 12.0, then hydrated aluminum oxide (III) will dissolve, and this, in turn, will decrease the content of aluminum in the composition of the resulting sorbent and, accordingly, decrease in capacity and selectivity concerning lithium.

A second step of the method is washing the obtained precipitate by decanting with deionized water to certain content of the at least one alkali metal salt in the mother solution. Content of the at least one alkali metal salt is necessary for bringing concentration to a value below 0.01 M. Exceeding this concentration will lead to a decrease in the freezing point of the mother liquor and, accordingly, to a decrease in the size of the sorbent granules obtained by freezing granulation.

In the third stage, after the completion of the washing of the precipitate by decantation, the stirring is stopped, and the precipitate is allowed to settle to the bottom of the reaction container freely. Sedimentation of the precipitate is carried out for 2 to-5 hours until the level of the precipitate in the reaction vessel reaches 50-60% of the level of the liquid phase in the reaction vessel.

Precipitation to less than 50% will require a very long deposition time, which is not technologically feasible from a practical point of view. Settling above 60% does not sufficiently concentrate the precipitate and ultimately requires the use of a more liquid phase during freezing, which is not economically advantageous.

A fourth step of the method is removing a transparent part of the mother solution to obtain a precipitate suspension in a residue of the mother solution.

A fifth step consists of transferring the obtained precipitate of the precipitate suspension in the residue of the mother solution to a freezer container (not shown) and freezing the precipitate to a solid frozen state for obtaining a mixed hydrated manganese (III), manganese (IV), and aluminum (III) oxide in an icy granular form. As mentioned above, the term "hydrated mixed oxide", e.g., of manganese (III), manganese (IV), and aluminum (III) oxide", does not mean a mechanical mixture of hydrated manganese (III) and (IV) oxides with hydrated aluminum oxide, but rather means a chemical compound of non-stoichiometric composition.

A sixth step of the method consists of removing the at least one alkali metal salt from the surface of the icy granular form. When freezing, the salt crystals contained in the mother liquor before freezing are pushed out by the freezing waterfront to its surface. To avoid re-entering these salts into the solution after defrosting, it is necessary to remove these salts from the surface of the ice. For the removal of crystals of at least one alkali metal salt from the icy surface of frozen water, it is necessary to wash it with a stream of clean deionized water.

At the seventh step of the method, the mixed hydrated manganese (III), manganese (IV), and aluminum (III) oxide is thawed to form a resulting granulated mixed hydrated manganese (III), manganese (IV), and aluminum (III) oxide. The mother solution is also thawed to form a thawed mother solution.

At the eighth step, the icy granular form is separated from an excess of the thawed mother solution. The separation of the solid phase is carried out either by decantation or by vacuum filtration on a suction filter (Netsch filter).

The ninth step consists of converting the resulting granulated mixed hydrated manganese (III), manganese (IV), and aluminum (III) oxide into an H-form of the granulated mixed hydrated manganese (III), manganese (IV), and aluminum (III) oxide. This result is achieved by treating the latter with an acid solution. The acid is exemplified by a hydrochloric acid, a nitric acid, and a sulfuric acid. The solution has a concentration in the range of 0.1M to 2 M. If the solution of an acid is below 0.1M, this will significantly increase water consumption, which is unfavorable from both environmental and economic points of view. If the concentration is higher than 2M, this will lead to significant losses of the sorbent due to the dissolution of its components in a solution of the corresponding acid. This factor leads to losses of the sorbent and a decrease in the yield of the finished product during synthesis. Changes that will occur in the ratio of components in the composition of granulated mixed hydrated manganese (III), manganese (IV), and aluminum (III) oxide may reduce the capacity and selectivity of the sorbent concerning lithium ions.

At a tenth step, the H-form of the granulated mixed hydrated manganese (III), manganese (IV), and aluminum (III) oxide is converted into a Li-form of the granulated mixed hydrated manganese (III), manganese (IV), and aluminum (III) oxide. This result is achieved by treating thereof with a solution of a lithium-containing compound. Examples of a lithium-containing compound suitable for the method are, e.g., a solution of lithium hydroxide LiOH and a solution of lithium carbonate $Li_2CO_3$.

An eleventh step is drying and calcining the Li-form of the granulated mixed hydrated manganese (III), manganese (IV), and aluminum (III) oxide for obtaining a dehydrated granulated mixed manganese (III), manganese (IV), aluminum (III) and lithium oxide, which contains in its composition four oxides and comprises a lithium-form of an inorganic ion-exchanger.

Figure 5:
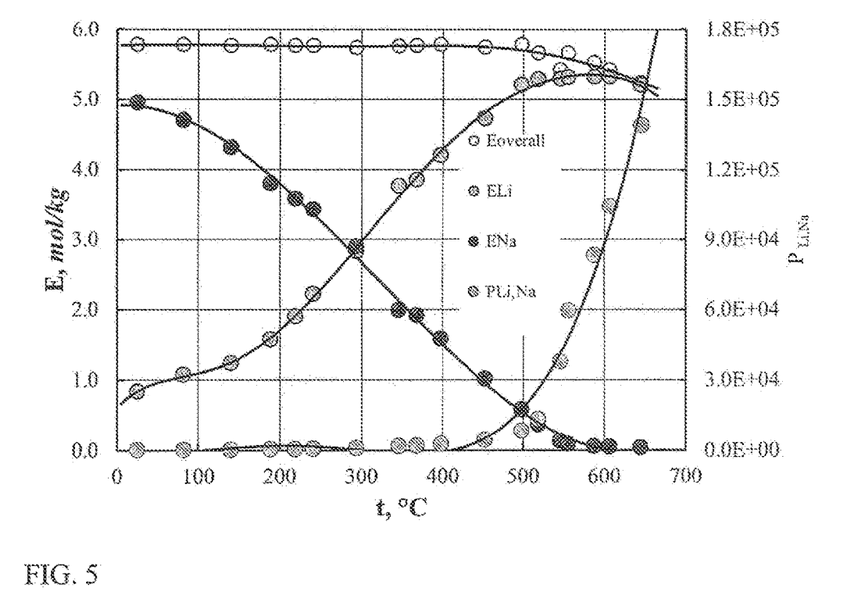
FIG. 5—is a graph showing heat treatment temperature's effect on the material's synthesis and its sorption-selective properties. $E_{overall}$ is the total ion exchange capacity of the sorbent. Eu is the selective capacity of the sorbent for lithium. $E_{Na}$ is the selective capacity of the sorbent for sodium; $P_{Li/Na}$ is the separation factor of lithium and sodium.

A choice of this temperature interval is based on experimental data shown in FIG. 5 is a graph illustrating the effect of heat treatment temperature on the synthesis of a material and its sorption-selective properties. In this drawing, $E_{overall}$ is a total sorbent capacity. $E_{Li}$ is a selective capacity for lithium during sorption from a complex solution containing 150 g/l of $Na^+$ and 20 mg/l of $Li^+$, $E_{Na}$ is a capacity for sodium during sorption together with lithium from the above solution. $P_{Li, Na}$ is a separation factor of lithium ions and sodium.

Figure 6:
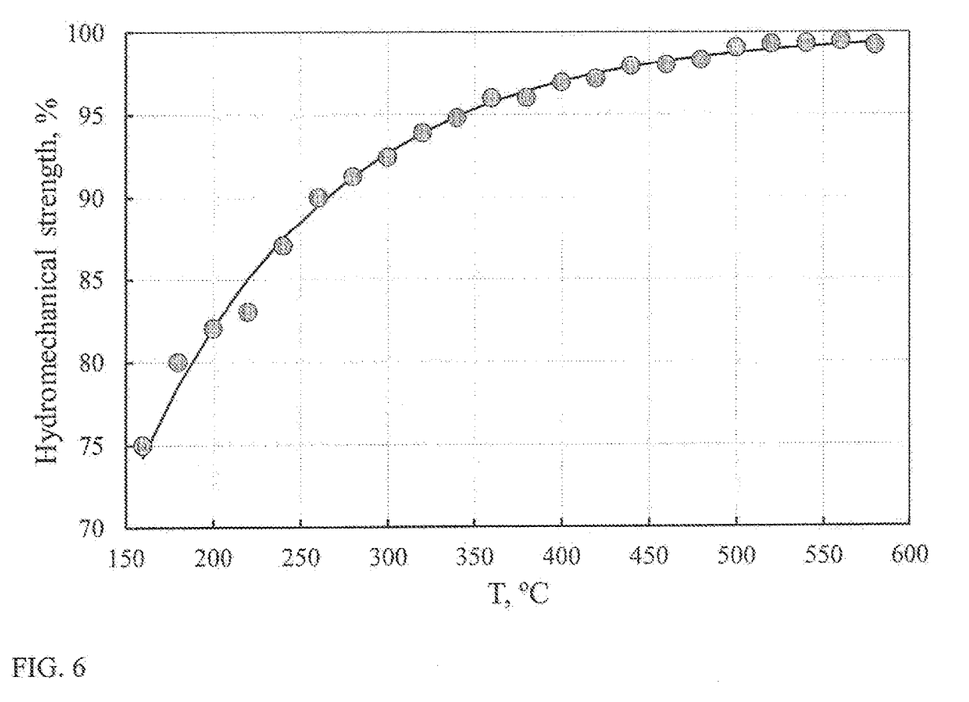
FIG. 6 is a graph showing the effect of heat treatment temperature on the hydromechanical stability of the sorbent.

FIG. 6 shows a dependence of the hydromechanical strength of the sorbent on the heat treatment temperature. From the presented data, it can be seen that the stage of calcination of the Li-form granulated hydrated mixed oxide of manganese (III), manganese (IV), and aluminum (III) is carried out at a temperature in the range from 300° C. to 700° C. If the heat treatment temperature is below 300° C., then the material will not achieve sufficient selectivity to lithium ions, and a sharp decrease in its hydromechanical strength will also be observed. If the heat treatment temperature is above 700° C., this will lead to destructive processes in the material, whereby the material will begin to lose its total and selective capacity for lithium.

At the twelfth step of the method, the obtained lithium form of an inorganic ion exchanger is converted into an H-form of the ion exchanger by treating it with an acid solution. This result is achieved by treating the latter with an acid solution. The acid is exemplified by a hydrochloric acid, a nitric acid, and a sulfuric acid. The solution has a concentration in the range of 0.1M to 2 M. If the solution of an acid has a concentration below 0.1, this will greatly increase water consumption, which is unfavorable from both environmental and economic points of view. If the concentration is higher than 2 M, this will lead to significant losses of the sorbent due to the dissolution of its components in a solution of the corresponding acid. This factor also will lead to losses of the sorbent and a decrease in the yield of the finished product during synthesis. Changes in the ratio of components in the composition of the sorbent may also occur, which will reduce the capacity and selectivity of the sorbent concerning lithium ions.

The method for obtaining inorganic sorbent for lithium extraction from lithium-containing brines presented in this application makes it possible to obtain a material of the following formula: $Li_xMnO_y \cdot zAl_2O_3$. In this formula, "x" ranges from 0.1 to 0.3; "y" is in the range from 1.6 to 2.0; and "z" is in the range from 0.0 to 0.1. In this case, the parameter "y" is an uncontrolled parameter, and its value depends on the parameter "x" and the conditions of material synthesis.

Suppose the parameter "x" has a value lower than 0.1. In that case, the exchange capacity of the sorbent will be too low to the extent that it would be economically unprofitable to use such a composition in the lithium extraction processes. Suppose the parameter "x" has a value higher than 0.3. In that case, the sorbent will have very low chemical stability, and the use of such a composition will become improper for lithium extraction. If the parameter "z" has a value higher than 0.1, then the sorbent will have low exchange capacity and selectivity and become unsuitable for use in the aforementioned processes.

The composition of the sorbent in the ion-exchange H-form prepared for the sorption of lithium has the following form: $H_xMnO_y \cdot zAl_2O_3 \cdot nH_2O$. In this case, the parameters "x", "y" and "z" have the same values as for the case of the original Li-form. The parameter "n" is an uncontrolled parameter, and its value is determined by the hydration of the material and depends on the parameter "x" and the conditions of material synthesis. The value of the parameter "n" depends on the drying conditions of the material samples in the H-form before measuring the water content in the material. Typically, the water content in the H-form of the sorbent is determined after drying the material at room temperature and atmospheric pressure to constant weight.

Examples of sorbents of various compositions obtained by the method of the invention in the H-form are given below in Table 1 (Li-forms are similar and, therefore, not included).

TABLE 1

Influence of Preparation Conditions on the Composition and Properties of Sorbents

| Synthesis temperature, °C. | x | y | z | n | The average degree of Mn oxidation | Selective capacity for Li+, ($E_{Li}$, mol/kg) | Coefficient of separation of ions of Li+ and Na+, ($P_{Li, Na}$) |
|---|---|---|---|---|---|---|---|
| 650 | 0.19 | 1.65 | 0.000 | 0.51 | 3.10 | 0.85 | $1.4 \cdot 10^4$ |
| 600 | 0.20 | 1.70 | 0.019 | 0.51 | 3.20 | 0.91 | $4.2 \cdot 10^4$ |
| 550 | 0.22 | 1.76 | 0.035 | 0.52 | 3.30 | 1.05 | $9.2 \cdot 10^4$ |
| 500 | 0.23 | 1.81 | 0.050 | 0.52 | 3.40 | 1.34 | $1.8 \cdot 10^5$ |
| 450 | 0.27 | 1.93 | 0.061 | 0.53 | 3.60 | 1.95 | $2.7 \cdot 10^5$ |
| 450 | 0.27 | 1.73 | 0.073 | 0.51 | 3.20 | 2.22 | $3.4 \cdot 10^5$ |
| 450 | 0.26 | 1.73 | 0.085 | 0.51 | 3.20 | 2.18 | $2.3 \cdot 10^5$ |
| 450 | 0.27 | 1.84 | 0.100 | 0.52 | 3.40 | 1.76 | $1.4 \cdot 10^5$ |
| 450 | 0.26 | 1.78 | 0.129 | 0.52 | 3.30 | 1.25 | $5.6 \cdot 10^4$ |
| 450 | 0.26 | 1.93 | 0.153 | 0.53 | 3.60 | 0.98 | $4.4 \cdot 10^4$ |
| 400 | 0.24 | 1.87 | 0.180 | 0.53 | 3.50 | 0.76 | $3.2 \cdot 10^4$ |
| 350 | 0.23 | 1.91 | 0.212 | 0.53 | 3.60 | 0.72 | $2.8 \cdot 10^4$ |
| 300 | 0.17 | 1.99 | 0.250 | 0.55 | 3.80 | 0.68 | $2.5 \cdot 10^4$ |
| 250 | 0.12 | 1.99 | 0.300 | 0.55 | 3.85 | 0.57 | $1.1 \cdot 10^3$ |

The conversion process of this stage is carried out by treating the obtained lithium form of an inorganic ion exchanger with an acid solution in an ion-exchange column having a head and a bottom with a supply of the solution of a lithium-containing compound to the head or the bottom of the column with a flow of the solution through the column at a linear speed in the range from 1 to 100 mm/min and until the release of lithium ions into the acid solution ceases.

If the flow speed is below 1 mm/min, such a speed is not economically and technologically feasible, which extends the processing time. If the speed exceeds 100 mm/min, it would be difficult to realize such a speed due to the high hydrodynamic resistance of the sorbent layer. Increased pressure may be required to force the solution through the sorbent layer, and technological equipment capable of working at such increased pressure may be needed for performing such a process. Also, high flow rates of solutions through the sorbent layer will cause rapid hydromechanical destruction of the sorbent Equipment and Procedures Used in the Method of the Invention Ion-Exchange Column The ion-exchange column used in the invention method was a standard chromatographic column with a diameter of up to 10 mm. The height of the sorbent layer was maintained in the range of 10 to 30 column diameters. The solution was fed through the column at a constant linear speed in the range of 1 to 10 mm/s. The feed rate of the solution was maintained by means of a peristaltic pump. During sorption experiments, special measures were taken to prevent air from entering the sorbent layer and partially dry the sorbent granules.

Determination of the Content of Lithium

The emission photometry of a flame carried out the determination of lithium in solutions. The most intense resonance line in the spectrum of lithium, 670.8 nm, was used for the analysis. This line corresponds to the transition between the energy levels $2^2S_{1/2}$ and $2^2P^0_{3/2}$ at the excitation energy of 1.85 eV. The method's sensitivity in determining lithium (with the FLAME PHOTOMETER, FP8000 series device; A. KRÜSS Optronic) was 0.001-0.0005 µg Li/ml. The lithium content was determined from the calibration based on reference solutions prepared based on pure metal salts and their mixtures present in the solutions under study, which were close in proportion to the test solutions. Determination of sodium content was carried out similarly.

Determination of the Content of Aluminum and Total Manganese

X-ray fluorescence spectroscopy was determined by the content of aluminum and manganese in the composition of the investigated sorbent samples. The experiments were performed on a VRA-30 spectrometer. The excitation source was a tube with a tungsten anode, operating at U=40 kV, I=30 mA. Pentaerythritol or LiF single crystals were used as the analyzer crystals. The registration was carried out using a proportional counter.

Determination of the content of aluminum was carried out along the line $K_\alpha$; the method's sensitivity was 0.005%. The total manganese content was determined along the line $K_\alpha$; the method's sensitivity was 0.02%. The background in the analysis was considered by the method of linear interpolation and by using a blank sample. Samples of materials for X-ray fluorescence analysis were prepared by compressing them in the form of tablets with NaCl (S7653 SIGMA-ALDRICH >99.5% (AT)) at a pressure of 4000 kg/cm². The instrument was calibrated using samples containing fixed amounts of manganese (II) oxide (431761 SIGMA-ALDRICH 99.99% trace metals basis) and aluminum oxide (229423 SIGMA-ALDRICH 99.99% trace metals basis).

Determination of the Content of Manganese

The content of Mn (II, III, IV) in the oxides was determined by dissolving a substance sample in a known volume of a titrated solution of oxalic acid in the presence of sulfuric acid. The atomic absorption method of analysis was used to determine the general content of manganese in solutions. A line of 279.4 nm characteristic for this element was used to determine the content of manganese.

The analysis was performed using an air-acetylene flame. The sensitivity of the method was 0.15 mg/ml. Li, Na, Al had no effect on the determination of manganese. Because inorganic acids impact the determination of manganese, the acid content in the analyzed solution was reduced to a fixed value before the analysis, and nitric acid was used as the acid having the least effect.

Sorption-Selective Parameters

The following characteristics were taken as parameters describing sorption-selective properties: a total exchange capacitance $E_{LiO}$, obtained by using 0.1 N LiOH solution as a sorbent; a selective lithium capacitance $E_{Li}$ used for sorption from a solution of lithium and sodium salts at an ionic ratio Li⁺:Na⁺ in the range of 1 to 10 at pH=12; and a coefficient $P_{Li,Na}$ of selectivity of the sorbent concerning lithium, which is a direct parameter that characterizes separation of lithium from sodium and which is represented by the following formula:

$$P_{Li,Na} = \frac{E_{Li1} \cdot C_{Na}}{E_{Na1} \cdot C_{Li}}$$

Where $E_{Li1}$ is a selective lithium capacity at sorption from a solution of lithium and sodium salts at ionic ratio Li⁺/Na⁺ of 1/10 at pH=12 (mol/kg sorb.);

$E_{Na1}$ is a sodium capacity at sorption from a solution of lithium and sodium salts at ionic ratio Li⁺/Na⁺ of 1/10 at pH=12 (mol/kg sorb.);

$C_{Li}$ is a molar concentration of Li+ in a solution of lithium and sodium salts at ionic ratio Li⁺/Na⁺ of 1/10 at pH=12 (mol/l);

$C_{Na}$ is a molar concentration of Na⁺ in a solution of lithium and sodium salts at ionic ratio Li⁺/Na⁺ of 1/10, pH=12 (mol/l).

Hydromechanical Strength of the Sorbent

Hydromechanical strength (HMS) of the sorbents was determined as follows: a sample of an air-dry sorbent weighing 1.00±0.01 g with a granule size of 0.25-1.0 mm was continuously mixed with 20 mL of water for 24 hours. Then the sorbent was quantitatively transferred to a sieve with a mesh size of 0.25 mm; the sorbent granules were thoroughly washed with water and dried at 100° C. to constant weight. After cooling to room temperature, the sorbent was weighed on an analytical balance with an accuracy of 0.01 g. The GMF value, expressed as a percentage, was calculated by the formula:

$$HMS = \frac{m_{end}}{m_0} \cdot 100\%$$

Where $m_{end}$ is the mass of the sorbent after mixing, and $m_0$ is the mass of the sorbent before mixing.

EXAMPLES

Example 1

The starting material for the Li-selective ion exchanger was $Mn(OH)_2$. The coagulum of $Mn(OH)_2$ was precipitated by reacting a 1M solution of $MnSO_4$ with a NaOH solution. During the synthesis, an additive of the calculated amount of $Al_2(SO_4)_3$ was introduced into the $MnSO_4$ solution. The $Mn(OH)_2$ coagulum with the addition of $Al(OH)_3$ was obtained as a paste. Simultaneously with the NaOH solution, potassium permanganate $KMnO_4$ was added to the reaction mixture. Potassium permanganate was taken in an amount close to the stoichiometry for the oxidation reaction. As a result, a hydrated manganese oxide with an average oxidation degree of manganese of 3.1 to 3.3 was produced. After oxidation of the paste with potassium permanganate, the final pH of the paste was in the range of 10.7 to 10.9. The precipitate was washed by decanting with deionized water to contain the amount of sodium and potassium salts in the mother solution to a value not exceeding 9.8 mg/l. The transparent part of the mother solution was removed to obtain a precipitate suspension in a residue of the mother solution. The resulting precipitate was transferred to a freezing container and placed in a freezer, where it was frozen at −5° C. Before defrosting, salt crystals precipitated on the ice surface were removed by washing with a stream of deionized water. After thawing, a granulate with a particle size of 0.1 to 1.0 mm was obtained. The granules yield was 134 g per 1.0 mol of manganese sulfate; the yield recalculated for the anhydrous product was −99.1 g. The bulk density of the dried granules with a particle size <1 mm was in the range of 0.94 g/cm³ to 1.06 g/cm³.

The obtained granules were loaded into an ion exchange column, where they were treated with 0.5 mol/l LiOH solution to saturate Li⁺ ions. The column size provided the necessary capacity for the used quantity of dried and crushed paste granules. A ratio between the height of the layer of material in the column and its diameter L/D was in the range: of L/D≥10 to 15.

After this operation, the material was discharged from the ion-exchange column and placed on a filter cloth to release free moisture and dry the obtained substance. The material could also be freed of moisture by placing it on a vacuum suction filter. Drying was conducted in the air for 1 to 2 days or when heated to a temperature in the range of 90 to 95° C. for 3 to 4 hours.

The air-dried material was calcined at a temperature of 450 to 550° C. (optimally 480° C.) for 4 to 6 hours. The material obtained after cooling was a Li-form sorbent. The yield of the sorbent in the Li-form per 1 mol of manganese sulfate was 98.3 g.

The sorbent was stored in a Li-form in a dry state. Before use, it was soaked in water and loaded into an ion exchange column for conversion into an H-form by treating under dynamic conditions with a solution of 0.3 to 0.5 mol/l $HNO_3$.

The sorbent was tested by extracting lithium from a solution (dynamic conditions) with the following composition: (g/l): LiCl—0.121; NaCl—150. The ionic ratio of $Li^+/Na^+$ was 1:900.

Under conditions of saturation of the cation exchanger with $Li^+$, the process of sorption was characterized by the exchange capacity $E_{Li}$=2.3 mol/kg and the separation factor $K_{Li,Na}$=4.2·$10^5$. Desorption of lithium from the cation exchanger proceeded easily and completely under the action of 0.3 to 0.5 mol/l solution of $HNO_3$. The loss of the sorbent, according to the results of its tests for 12 cycles in the ion exchange column, amounted to an average of not more than 0.5-0.8% per cycle.

Example 2

The starting material for the Li-selective ion exchanger was $Mn(OH)_2$. The coagulum of $Mn(OH)_2$ was precipitated by reacting a 1M solutions of $MnCl_2$ with a NaOH solution. During the synthesis, an additive of the calculated amount of $AlCl_3$ was introduced into the $MnCl_2$ solution. The $Mn(OH)_2$ coagulum with the addition of $Al(OH)_3$ was obtained as a paste. Simultaneously with the KOH solution, potassium permanganate $KMnO_4$ was added to the reaction mixture. Potassium permanganate was taken in an amount close to the stoichiometry for the oxidation reaction. As a result, a hydrated manganese oxide with an average oxidation degree of manganese of 3.1 to 3.3 was produced. After oxidation of the paste with manganese permanganate, the final pH of the paste was in the range of 11.5 to 11.9. The precipitate was washed by decanting with deionized water to bring the content of sodium and potassium salts in the mother solution to a value not exceeding 10.1 mg/l. The transparent part of the mother solution was removed to obtain a precipitate suspension in a residue of the mother solution.

The resulting precipitate was transferred to a freezing container and placed in a freezer, where it was frozen at −6° C. Before defrosting, salt crystals precipitated on the ice surface were removed by washing with a stream of deionized water. After thawing, a granulate with a particle size of 0.1 to 1.0 mm was obtained.

The granules yield per 1 mol of manganese chloride was 132 g; the yield recalculated for an anhydrous product was 97.8 g. The bulk density of the dried granules with a particle size <1 mm was about 0.94 to 1.06 g/$cm^3$.

The obtained granules were loaded into an ion exchange column, where they were treated with a 0.5 mol/l LiOH solution to saturate $Li^+$ ions. This process was conducted similarly to the one described in Example 1.

After this operation, the material was discharged from the ion-exchange column and placed on a filter cloth to release free moisture and dry the obtained substance. The material could also be freed of moisture by placing it on a vacuum suction filter. Drying was conducted in the air for 1 to 2 days or by heating to a temperature in the range of 90 to 95° C. for 3 to 4 hours.

The air-dried material was calcined at a temperature of 500 to 550° C. for 4 to-6 hours. The material obtained after cooling was a Li-form sorbent. The yield of the sorbent in the Li-form per 1 mol of manganese sulfate was 99.7 g.

The sorbent was stored in a Li-form in a dry state. Before use, it was soaked in water and loaded into an ion exchange column for conversion into an H-form by treating under dynamic conditions with a solution of 0.15 to 0.25 mol/l of $H_2SO_4$.

The material obtained after cooling was a Li-form sorbent. The yield of the sorbent in the Li-form per 1 mol of manganese sulfate was 101.9 g.

Testing of the sorbent was carried out by extracting lithium from a solution (dynamic conditions) having the following composition: (kg/$m^3$): LiCl—0.121; NaCl—150, $MgCl_2$—9.5, $CaCl_2$—6.0, KCl—4.0, KBr—0.2, KI—0.1, NaHCO3—0.2. The ionic ratio of $Li^+/Na^+$ was 1:900.

Under conditions of saturation of the cation exchanger with $Li^+$, the process of sorption was characterized by the exchange capacity $E_{Li}$=2.3 mol/kg and the separation factor $K_{Li,Na}$=5.2·$10^5$. Desorption of lithium from the cation exchanger proceeded easily and completely under the action of 0.3 to 0.5 mol/l solution of $HNO_3$. According to the results of its tests for 12 cycles in the ion exchange column, the loss of the sorbent amounted to an average of not more than 0.3-0.4% per cycle.

Example 3

Similar to the previous examples, the coagulum of $Mn(OH)_2$ was precipitated by reacting a 1M solutions of $MnAc_2$ with a NaOH solution. During the synthesis, an additive of the calculated amount of $Al(Ac)_3$ was introduced into the $MnAc_2$ solution. The $Mn(OH)_2$ coagulum with the addition of $Al(OH)_3$ was obtained as a paste. Simultaneously with the KOH solution, potassium permanganate $KMnO_4$ was added to the reaction mixture. Potassium permanganate was taken in an amount close to the stoichiometry for the oxidation reaction. As a result, a hydrated manganese oxide with an average oxidation degree of manganese of 3.1 to 3.3 was produced. After oxidation of the paste with potassium permanganate, the final pH of the paste was in the range of 11.5 to 11.9. The precipitate was washed by decanting with deionized water to contain the amount of sodium and potassium salts in the mother solution to a value not exceeding 9.5 mg/l. The transparent part of the mother solution was removed to obtain a precipitate suspension in a residue of the mother solution. The resulting precipitate was transferred to a freezing container and placed in a freezer, where it was frozen at −7° C. Before defrosting, salt crystals precipitated on the ice surface were removed by washing with a stream of deionized water. After thawing, a granulate with a particle size of 0.1 to 1.0 mm was obtained.

Per 1 mol of manganese acetate, the yield of the dried paste was 141.0 g; the anhydrous substance yield was 100.1 g. The bulk density of the dried paste, with a particle size of <1 mm, was in the range of 0.94 to 1.06 g/$cm^3$.

The obtained granules were loaded into an ion exchange column, where they were treated with a 0.5M LiOH solution to saturate $Li^+$ ions. This process and the subsequent drying were performed in the same manner as in Example 1.

The air-dried material was calcined at a temperature of 450 to 500° C. for 4 to 6 hours. The material obtained after cooling was a Li-form sorbent. The yield of the sorbent in the Li-form per 1 mol of manganese sulfate was 100.9 g.

The sorbent was stored in a Li-form in a dry state. Before use, it was soaked in water and loaded into an ion exchange column for conversion into an H-form by treating under dynamic conditions with a solution of 0.3 to 0.5 mol/l of $HNO_3$.

The material obtained after cooling was a Li-form sorbent. The yield of the sorbent in the Li-form per 1 mol of manganese sulfate was 101.9 g.

Testing of the sorbent was carried out by extracting lithium from a solution (dynamic conditions) having the following composition: (kg/m$^3$): LiCl—0.121; NaCl—150, $MgCl_2$—9.5, $CaCl_2$—6.0, KCl—4.0, KBr—0.2, KI—0.1, $NaHCO_3$—0.2. The ionic ratio of $Li^+/Na^+$ was 1:900.

Under conditions of saturation of the cation exchanger with $Li^+$, the process of sorption was characterized by the exchange capacity $E_{Li}$=2.3 mol/kg and the separation factor $K_{Li,Na}$=4.8·10$^5$. Desorption of lithium from the cation exchanger proceeded easily and completely under the action of a 0.3 to 0.5 mol/l solution of $HNO_3$. According to the results of its tests for 10 cycles in the ion exchange column, the loss of the sorbent amounted to an average of not more than 0.3-0.5% per cycle.

Operation conditions and parameters used in other examples are summarized in Tables 2 and 3. These tables present the results of tests of sorbents obtained under different conditions of synthesis but within the framework of the present invention. The ion exchange test used a solution of the following composition (kg/m3): LiCl—0.121; NaCl—150. The ionic ratio of $Li^+/Na^+$ was 1:900 (pH=6.1).

TABLE 2

Operation conditions and parameters used in the process

| Sample No. | Amount of added aluminum oxide $\frac{Al_2O_3}{MnO_x}$ | Selective capacity for $Li^+$, ($E_{Li}$, mol/kg) | Coefficient of separation of ions of $Li^+$ and $Na^+$, ($P_{Li,Na}$) | The average degree of Mn oxidation | Synthesis temperature, ° C. |
|---|---|---|---|---|---|
| 1 | 0.000 | 0.85 | 1.4 · 10$^4$ | 2.8 | 650 |
| 2 | 0.019 | 0.91 | 4.2 · 10$^4$ | 3.2 | 600 |
| 3 | 0.035 | 1.05 | 9.2 · 10$^4$ | 3.3 | 550 |
| 4 | 0.050 | 1.34 | 1.8 · 10$^5$ | 3.4 | 500 |
| 5 | 0.061 | 1.95 | 2.7 · 10$^5$ | 3.6 | 450 |
| 6 | 0.073 | 2.22 | 3.4 · 10$^5$ | 3.2 | 450 |
| 7 | 0.085 | 2.18 | 2.3 · 10$^5$ | 3.2 | 450 |
| 8 | 0.100 | 1.76 | 1.4 · 10$^5$ | 3.4 | 450 |
| 9 | 0.129 | 1.25 | 5.6 · 10$^4$ | 3.3 | 450 |
| 10 | 0.153 | 0.98 | 4.4 · 10$^4$ | 3.6 | 450 |
| 11 | 0.180 | 0.76 | 3.2 · 10$^4$ | 3.5 | 400 |
| 12 | 0.212 | 0.72 | 2.8 · 10$^4$ | 3.6 | 350 |
| 13 | 0.250 | 0.68 | 2.5 · 10$^4$ | 3.8 | 300 |
| 14 | 0.300 | 0.57 | 1.1 · 10$^3$ | 3.85 | 250 |

TABLE 3

Other operation conditions and parameters used in the process

| Sample No. | Amount of added aluminum oxide $\frac{Al_2O_3}{MnO_x}$ | Selective capacity for $LI^+$, ($E_{Li}$, mol/kg) | Coefficient of separation of ions of $Li^+$ and $Na^+$, ($P_{Li,Na}$) | The average degree of Mn oxidation | Synthesis temperature, ° C. |
|---|---|---|---|---|---|
| 1 | 0.075 | 3.1 | 9.5 · 10$^2$ | 3.6 | 295 |
| 2 | 0.075 | 3.9 | 1.7 · 10$^3$ | 3.5 | 345 |
| 3 | 0.075 | 4.3 | 2.0 · 10$^3$ | 3.4 | 368 |
| 4 | 0.075 | 4.5 | 2.6 · 10$^3$ | 3.5 | 400 |
| 5 | 0.075 | 5.0 | 4.5 · 10$^3$ | 3.6 | 450 |
| 6 | 0.075 | 5.2 | 8.2 · 10$^3$ | 3.5 | 500 |
| 7 | 0.075 | 5.3 | 1.3 · 10$^4$ | 3.4 | 520 |
| 9 | 0.075 | 5.3 | 3.7 · 10$^4$ | 3.2 | 545 |
| 9 | 0.075 | 5.2 | 8.3 · 10$^4$ | 3.1 | 590 |
| 10 | 0.075 | 5.324 | 1.04 · 10$^5$ | 3.0 | 610 |
| 11 | 0.075 | 5.324 | 1.40 · 10$^5$ | 2.9 | 645 |

As can be seen from the tables, the results of testing of samples that were prepared within the scope of the invention served the purposes of the invention. On the other hand, the samples that were beyond the scope could not provide the effects of the invention.

The technical and economic advantages of this method in comparison with the prior-art method were the following:
a) increase in the sorption capacity of the sorbet for lithium by 2.7 times and in selectivity for lithium by 25 times, and
b) 10-15% improvement in the operating properties of the sorbent by reducing its losses in repeated cycles of sorption and desorption due to an increase in hydromechanical strength.

Thus, it has been shown that the sorbent obtained by the invention method is suitable for industrial lithium production by extraction from complex natural and technological brines.

The method of the invention for obtaining inorganic sorbents for extracting lithium from natural and technological brines was described concerning specific examples of compositions and technological steps. It is understood, however, that these compositions and process steps were given only as examples and that any changes and modifications are possible within the scope of the attached patent claims. For example, the units of the synthesis equipment may vary depending on specific conditions. The brines may be taken from different sources. The sorbents obtained by the method of the invention may find different applications, and the synthesis of the sorbents can be conducted at different temperatures selected according to specific conditions. Various acids can be used in the method.

The invention claimed is:

1. A method for obtaining an inorganic sorbent for extraction of lithium from a lithium-containing brine, the method comprising:
    contacting a mixture of at least one soluble manganese (II) salt in an aqueous solution and at least one aluminum (III) salt in an aqueous solution with an alkali solution in a reaction container in a mother solution in the presence of an alkali metal permanganate to obtain a precipitate of a mixed hydrated manganese (III), manganese (IV), and aluminum (oxide, which comprises a non-stoichiometric compound;
    washing the obtained precipitate by decanting with deionized water to a certain content in the mother solution of the at least one alkali metal salt;

discontinuing the decanting and settling the precipitate in the reaction container to a predetermined level;

removing a transparent part of the mother solution to obtain a precipitate suspension in a residue of the mother solution;

transferring the obtained precipitate of the precipitate suspension in the residue of the mother solution to a freezer container and freezing the precipitate to a solid frozen state for obtaining a mixed hydrated manganese (III), manganese (IV), and aluminum (III) oxide in an icy granular form having a surface;

removing at least one alkali metal salt from the surface of the icy granular form;

thawing the mixed hydrated manganese (III), manganese (IV), and aluminum (III) oxide to form a resulting granulated mixed hydrated manganese (III), manganese (IV), and aluminum (III) oxide and thawing the mother solution to form a thawed mother solution;

separating the icy granular form from an excess of the thawed mother solution;

converting the resulting granulated mixed hydrated manganese manganese (IV), and aluminum (III) oxide into an H-form of the granulated mixed hydrated manganese (III), manganese (IV), and aluminum (III) oxide by treating thereof with a solution of an acid;

converting the H-form of the granulated mixed hydrated manganese (III), manganese (IV), and aluminum (III) oxide into a Li-form of the granulated mixed hydrated manganese (III), manganese (IV), and aluminum (III) oxide by treating thereof with a solution of a lithium-containing compound;

drying and calcining the Li-form of the granulated mixed hydrated manganese (III), manganese (IV), and aluminum (III) oxide to obtain a dehydrated granulated mixed manganese (III), manganese (IV), and aluminum (III) oxide, which contains in its composition four oxides and comprises a lithium-form of an inorganic ion-exchanger; and converting the obtained lithium-form of an inorganic ion exchanger into an H-form of the ion-exchanger by treating thereof with an acid solution.

2. The method of claim 1, wherein, in a Li-form, the inorganic sorbent is represented by the following formula:

$Li_xMnO_y \cdot zAl_2O_3$, where "x" ranges from 0.1 to 0.3; "y" is in the range from 1.6 to 2.0; and "z" is in the range from 0.0 to 0.1.

3. The method according to claim 2, wherein in a mixture of the aqueous solution of the at least one soluble manganese (II) salt and the aqueous solution of the at least one aluminum (III) salt, a molar ratio of manganese (II) to aluminum (III) is maintained in the range of 1:0.0 to 1:0.20.

4. The method according to claim 2, wherein the at least one soluble manganese (II) salt is selected from the group consisting of $MnSO_4$, $MnCl_2$, $Mn(NO_3)_2$, $Mn(Ac)_2$, $MnBr_2$, $Mn(ClO_4)_2$.

5. The method according to claim 2, wherein the at least one aluminum (III) salt is selected from the group consisting of $Al_2(SO_4)_3$, $AlCl_3$, $Al(OH)Cl_2$, $Al(NO_3)_3$, $Al(Ac)_3$, $Al(ClO_4)_3$, and $AlBr_3$.

6. The method according to claim 2, wherein contacting the mixture of at least one soluble manganese salt (II) and at least one aluminum salt (III) with an alkali solution in the presence of an alkali metal permanganate is performed at a molar ratio of the soluble manganese (II) salt to the alkali metal permanganate in a ratio from 1:1 to 1:2.

7. The method according to claim 2, wherein the alkali solution that contacts the mixture of the at least one soluble manganese salt (II) and the at least one aluminum salt (III) in the presence of an alkali metal permanganate is a hydroxide selected from the group consisting of NaOH, KOH, and $NH_4OH$.

8. The method, according to claim 6, is characterized in that the manganese (II) salt in an aqueous is used at concentrations in the range from 0.1 to 2.5 M.

9. The method according to claim 7, wherein in the step of contacting a mixture of at least one soluble manganese (II) salt in an aqueous solution and at least one aluminum (III) salt in an aqueous solution with an alkali solution in the presence of an alkali metal permanganate, a pH of the precipitate suspension is adjusted to a value in the range from 9.0 to 12.0.

10. The method, according to claim 2, wherein washing of the precipitate is carried out to the total salt content of the at least one alkali metal in the mother liquor to a value not exceeding 10 mg/l.

11. The method, according to claim 2, wherein the suspension freezing is carried out within 5 to 30 hours at a temperature range of −3° C. to −10° C.

12. The method according to claim 2, wherein the step of removing the at least one alkali metal salt from the surface of the icy granular form is carried out by washing the surface with a stream of deionized water, the step of defrosting the mixed hydrated oxide, manganese (III), manganese (IV), and aluminum (III) is carried out at a temperature in the range of 10 to 40° C., and the step of separating the icy granular form from an excess of the thawed mother solution is carried out by selecting a process selected from the group of decantation, filtration, centrifugation, and filtration-centrifugation.

13. The method according to claim 2, wherein the solution of an acid is used in the step of converting the resulting granulated mixed hydrated manganese (III), manganese (IV), and aluminum (III) oxide into an H-form of the granulated mixed hydrated manganese (III), manganese (IV), and aluminum (III) oxide is the solution of an acid having a concentration in the range of 0.1 to 2 M and wherein an acid is selected from the group consisting of hydrochloric acid, a nitric acid, and sulfuric acid.

14. The method according to claim 2, wherein the solution of a lithium-containing compound is used in the step of converting the H-form of the granulated mixed hydrated manganese (III), manganese (IV), and aluminum (III) oxide into a Li-form of the granulated mixed hydrated manganese (III), manganese (IV), and aluminum (III) oxide has a concentration in the range of 0.01 M to 0.5 M and comprises a solution of a compound selected from the group consisting of LiOH, $Li_2CO_3$, LiCl, $Li_2SO_4$, LiBr, LiAc, and $LiClO_4$ with a concentration ranging from 0.01 to 0.5 M.

15. The method according to claim 14, wherein the stage of converting the H-form of the granulated mixed hydrated manganese manganese (IV), and aluminum (III) oxide into a Li-form of the granulated mixed hydrated manganese (III), manganese (IV), and aluminum (III) oxide is carried out in an ion-exchange column having a head and a bottom with a supply of the solution of a lithium-containing compound to the head or the bottom of the column with a flow of the solution through the column at a linear speed in the range from 1 to 100 mm/min.

16. The method, according to claim 2, wherein the drying step is carried out at a temperature range from 15° C. to 40° C. for 1 to 5 hours.

17. The method according to claim 16, wherein the step of drying is carried out until a moisture content in the Li-form of the granulated mixed hydrated manganese (III), manganese (IV), and aluminum (III) oxide is established in the range of 10% to 20%.

18. The method according to claim 2, wherein the stage of calcination of the Li-form granulated hydrated mixed oxide of manganese (III), manganese (IV), and aluminum (III) is carried out at a temperature in the range from 300° C. to 700° C.

19. The method, according to claim 18, wherein the calcining stage is carried out for a time in the range of 1 hour to 15 hours.

20. The method according to claim 19, wherein the stage of converting the obtained lithium-form of an inorganic ion exchanger into an H-form of the ion-exchanger by treating the obtained lithium-form of an inorganic ion exchanger is carried out by using the solution of an acid having a concentration in the range of 0.1 M to 4 M and wherein an acid is selected from the group consisting of hydrochloric acid, a nitric acid, and sulfuric acid.

\* \* \* \* \*